US012722990B2

(12) United States Patent
Garg

(10) Patent No.: US 12,722,990 B2
(45) Date of Patent: Sep. 1, 2026

(54) INTEGRATED FAUCET FOR COPPER RELEASE

(71) Applicant: Kohler India Corporation Private Limited, Haryana (IN)

(72) Inventor: Yachna Garg, Haryana (IN)

(73) Assignee: Kohler India Corporation Private Limited, Haryana (IN)

( * ) Notice: Subject to any disclaimer, the term of this patent is extended or adjusted under 35 U.S.C. 154(b) by 434 days.

(21) Appl. No.: 17/715,505

(22) Filed: Apr. 7, 2022

(65) Prior Publication Data

US 2022/0324728 A1 Oct. 13, 2022

(30) Foreign Application Priority Data

Apr. 9, 2021 (IN) ............................ 202111016692

(51) Int. Cl.

| | |
|---|---|
| ***C02F 1/46*** | (2023.01) |
| ***C02F 1/00*** | (2023.01) |
| ***C02F 1/461*** | (2023.01) |
| ***C02F 1/68*** | (2023.01) |
| ***E03C 1/04*** | (2006.01) |

(52) U.S. Cl.

CPC ............ *C02F 1/4606* (2013.01); *C02F 1/008* (2013.01); *C02F 1/46104* (2013.01); *C02F 1/685* (2013.01); *E03C 1/04* (2013.01); *C02F 2201/005* (2013.01); *C02F 2201/46135* (2013.01); *C02F 2201/4614* (2013.01); *C02F 2201/4615* (2013.01); *C02F 2307/06* (2013.01); *E03C 2201/40* (2013.01)

(58) Field of Classification Search

CPC ........................... C02F 1/4606; C02F 2307/06

See application file for complete search history.

(56) References Cited

U.S. PATENT DOCUMENTS 6,800,207 B2 10/2004 Holt et al.
2018/0117197 A1* 5/2018 Kuroishi ............... C02F 1/4606
2018/0297862 A1* 10/2018 Nourbakhsh ........... C02F 1/008

FOREIGN PATENT DOCUMENTS

WO WO-9628390 A1 * 9/1996 ............ C02F 1/4606
WO WO-2005100259 A1 * 10/2005 ............ C02F 1/4606

OTHER PUBLICATIONS

WO 2010023712 A1—translation (Year: 2010).*
WO 2005100259 A1—translation (Year: 2005).*
KR 20060103414 A—translation (Year: 2006).*
English Translation of WO2005100259A1 (Year: 2005).*

* cited by examiner

*Primary Examiner* — Brian W Cohen
(74) *Attorney, Agent, or Firm* — Foley & Lardner LLP

(57) ABSTRACT

Described herein is a faucet arrangement, comprising a faucet unit and an electrolytic cell unit. The faucet unit is adapted to release water. The electrolytic cell unit is integrated with the faucet unit, and is adapted to release a controlled dosage of copper ions to water released by the faucet unit.

16 Claims, 4 Drawing Sheets

INTEGRATED FAUCET FOR COPPER RELEASE

CROSS-REFERENCE TO RELATED APPLICATIONS

The present application claims priority to and the benefit of Indian Patent Application No. 202111016692, filed Apr. 9, 2021, the entire disclosure of which is incorporated by reference herein.

TECHNICAL FIELD

The present disclosure generally relates to faucet arrangements. More particularly, the present disclosure relates to a faucet arrangement capable of supplying water treated with copper ions.

BACKGROUND

Historically, it is proven that intake of water treated with copper ions have several health and skin benefits. For example, a few people are recommended to drink water that is stored in copper vessels for a short period. However, considering a busy schedule of people these days, it is many a times not feasible to store water in the copper vessels.

One such solution of the aforementioned problem relates to employing an integrated copper ion treating unit in a water purifying system. The copper ion treating unit releases copper ions to purified water, to be supplied as treated drinking water. The treated drinking water may then be consumed by a user. Although, such water purifying systems have proven to be effective, however it utilizes a lot of space in kitchen area.

Furthermore, as copper ions have good antioxidant properties, it may be beneficial for using water treated with copper ions for handwashing purposes, bathing purposes, and/or hygiene purposes. However, the aforementioned water purifying systems are suitable only for drinking purposes, and are unsuitable for handwashing purposes, or bathing purposes, or other such purposes. Moreover, such copper ion treating unit in the water purifying systems is based on a relatively complex structure and arrangement, which increases a cost associated with the water purifying systems.

Accordingly, in light of the aforementioned drawbacks and several other inherent in the existing arts, there is a well-felt need to provide faucet arrangement capable of supplying water treated with copper ions.

SUMMARY

One object of the present invention relates to a faucet arrangement capable of supplying water treated with copper ions.

Another object of the present invention relates to a faucet arrangement including a faucet unit for releasing water, and an electrolytic cell unit integrated with the faucet unit, wherein the electrolytic cell unit is adapted to release a controlled dosage of copper ions to water released by the faucet unit.

Yet another object of the present invention relates to a faucet arrangement including a faucet unit and an electrolytic cell unit, wherein the faucet unit includes a faucet housing defining a cell mounting space, and wherein the electrolytic cell unit is disposed within the cell mounting space defined in the faucet housing of the faucet unit. This arrangement provides relatively easily installation/removal of the electrolytic cell unit from the faucet unit.

Yet another object of the present invention relates to a faucet arrangement including a faucet unit, an integrated copper electrolytic cell unit, and a control unit. The faucet unit release water. The electrolytic cell unit releases a dosage of copper ions to water released by the faucet unit. The control unit controls the dosage of copper ions released by the electrolytic cell unit, based on a user-selected mode of operation among a plurality of modes of the faucet unit. The plurality of modes of the faucet unit includes, such as but not limited to, drinking mode, bathing mode, handwashing mode, and/or a hygiene mode.

BRIEF DESCRIPTION OF DRAWINGS

The present invention, both as to its organization and manner of operation, together with further objects and advantages, may best be understood by reference to the following description, taken in connection with the accompanying drawings. These and other details of the present invention will be described in connection with the accompanying drawings, which are furnished only by way of illustration and not in limitation of the invention, and in which drawings.

DETAILED DESCRIPTION

Figure 1:
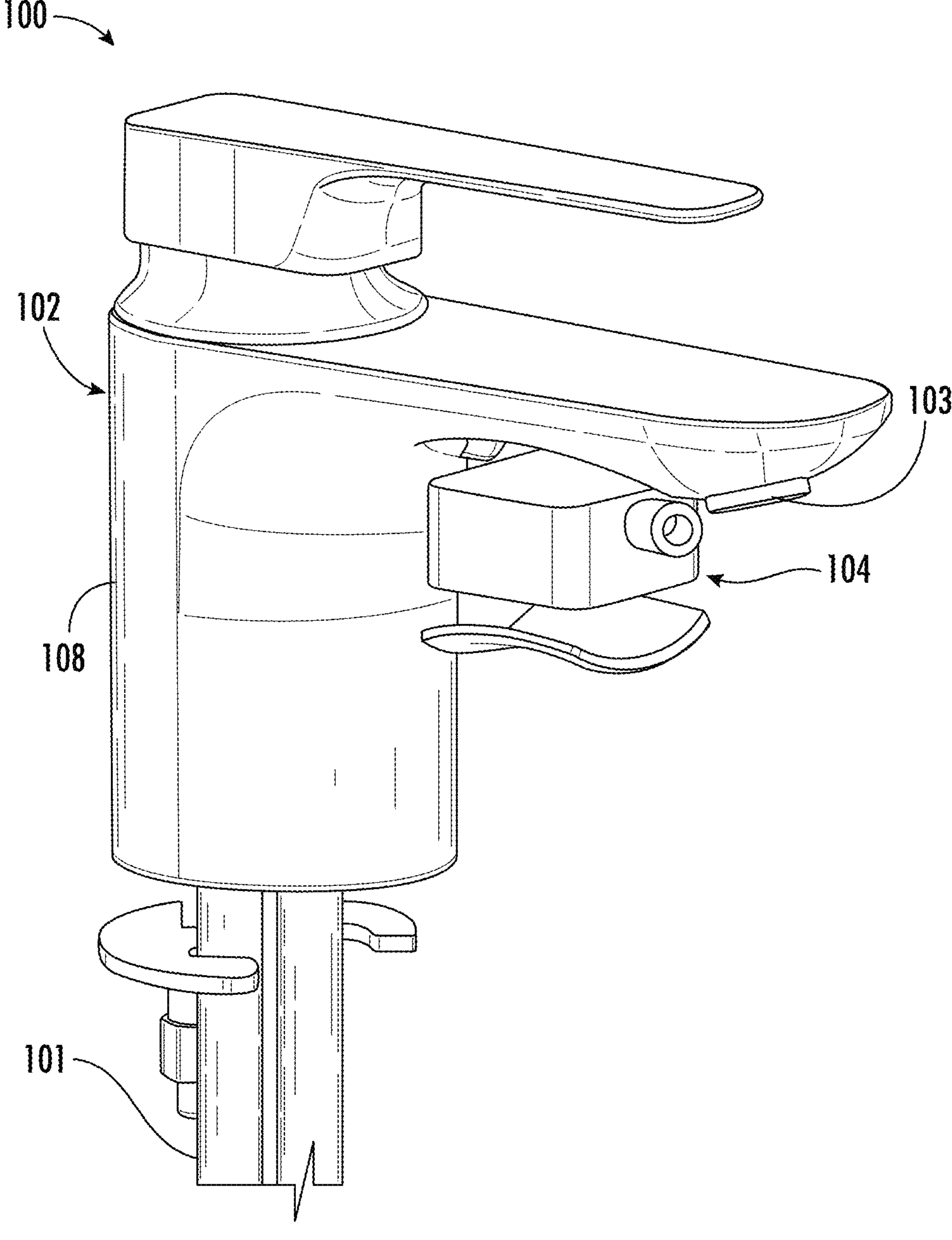
FIG. 1 illustrates a perspective view of a faucet arrangement, in accordance with an embodiment of the present disclosure.

In the following description, for the purposes of explanation, various specific details are set forth in order to provide a thorough understanding of embodiments of the present invention. It will be apparent, however, that embodiments of the present invention may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present invention are described below, as illustrated in various drawings in which like reference numerals refer to the same parts throughout the different drawings.

Figure 2:
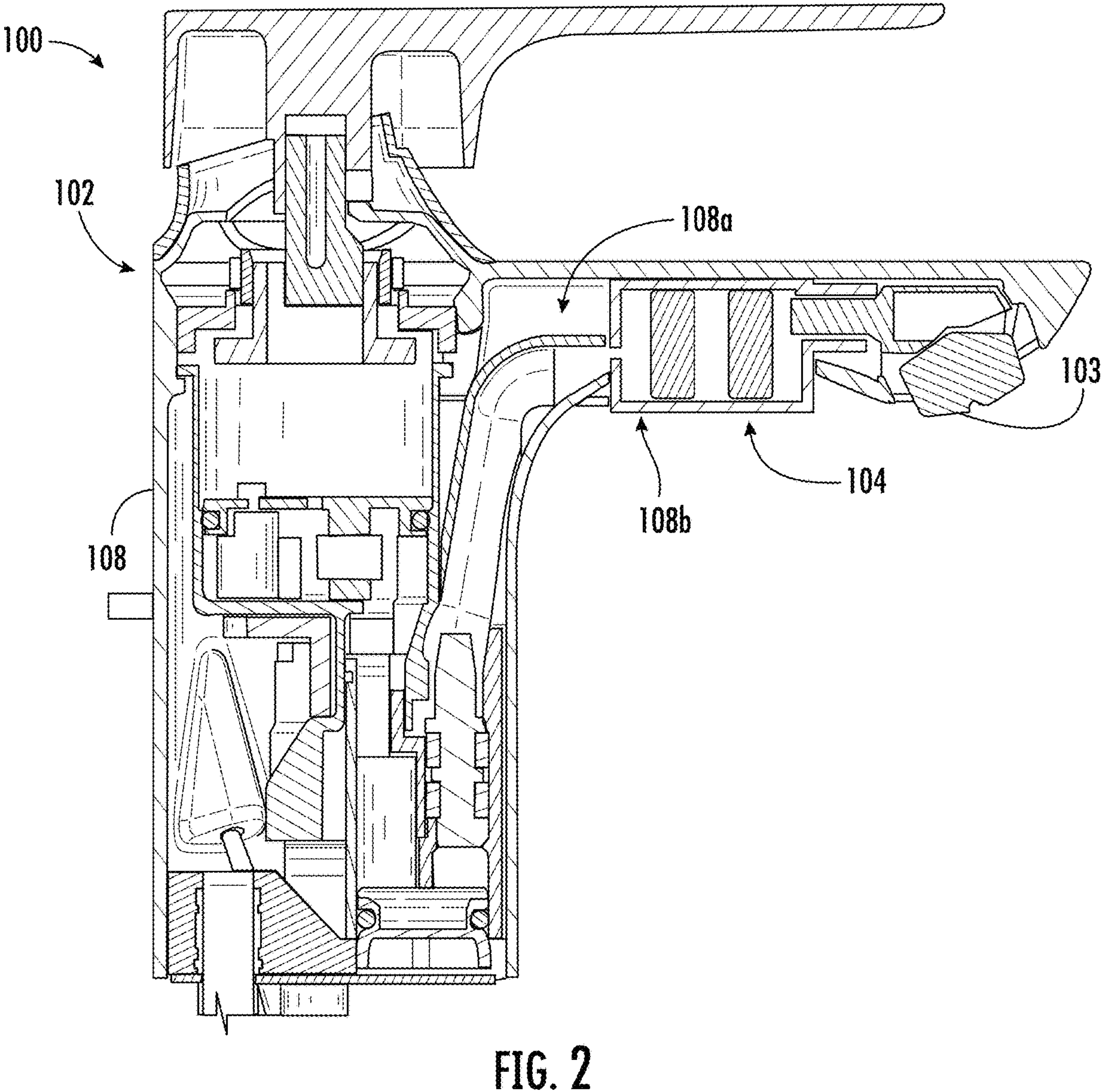
FIG. 2 illustrates a section view of a faucet arrangement, in accordance with an embodiment of the present disclosure.
Figure 4:
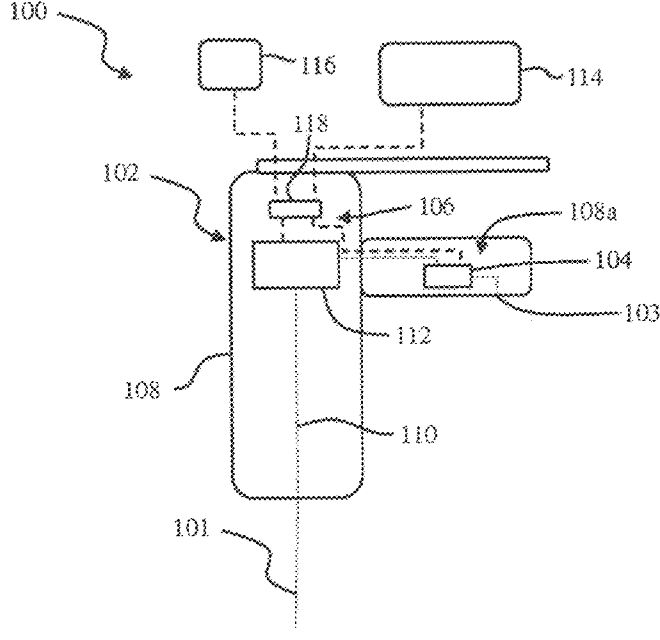
FIG. 4 illustrates a schematic view of the faucet arrangement, in accordance with the concepts of the present disclosure.

FIG. 1 shows a perspective view of a faucet arrangement 100, in accordance with an embodiment of the present disclosure. FIG. 2 illustrates a section view of a faucet arrangement 100, in accordance with an embodiment of the present disclosure. FIG. 4 shows a schematic of the faucet arrangement 100, in accordance with the concepts of the present disclosure. FIG. 1, FIG. 2, and FIG. 4, should be referred to in conjunction with each other, in order to clearly understand a scope of the present disclosure related to the faucet arrangement 100. The faucet arrangement 100 is adapted to supply water treated with copper ions. The faucet arrangement 100 includes a supply line 101, a faucet unit 102, an electrolytic cell unit 104, and a control unit 106.

The faucet unit 102 is similar to a conventionally known faucet that is fluidly connected to a water supply, via the supply line 101. The faucet unit 102 is adapted to intake water from supply line 101, and release water through the water outlet 103, as and when required. In one embodiment, the faucet unit 102 is a valve actuated faucet unit, wherein water is released upon actuation of the valve actuated faucet unit 102. In another embodiment, the faucet unit 102 is a solenoid actuated faucet unit 102, wherein water is released upon actuation of the solenoid actuated faucet unit 102. Although, the concepts of the present disclosure will be described as applied to the solenoid actuated faucet unit 100, it may be obvious to a person skilled in the art that the concepts of the present disclosure may also extend to manual valve actuated faucet unit 102. The solenoid actuated faucet unit 102 is automatically actuated to supply water at the water outlet 103, upon receiving input at a portion of the control unit 106. The faucet unit 102 includes a faucet housing 108, a faucet supply line 110, and a solenoid valve 112.

Figure 3:
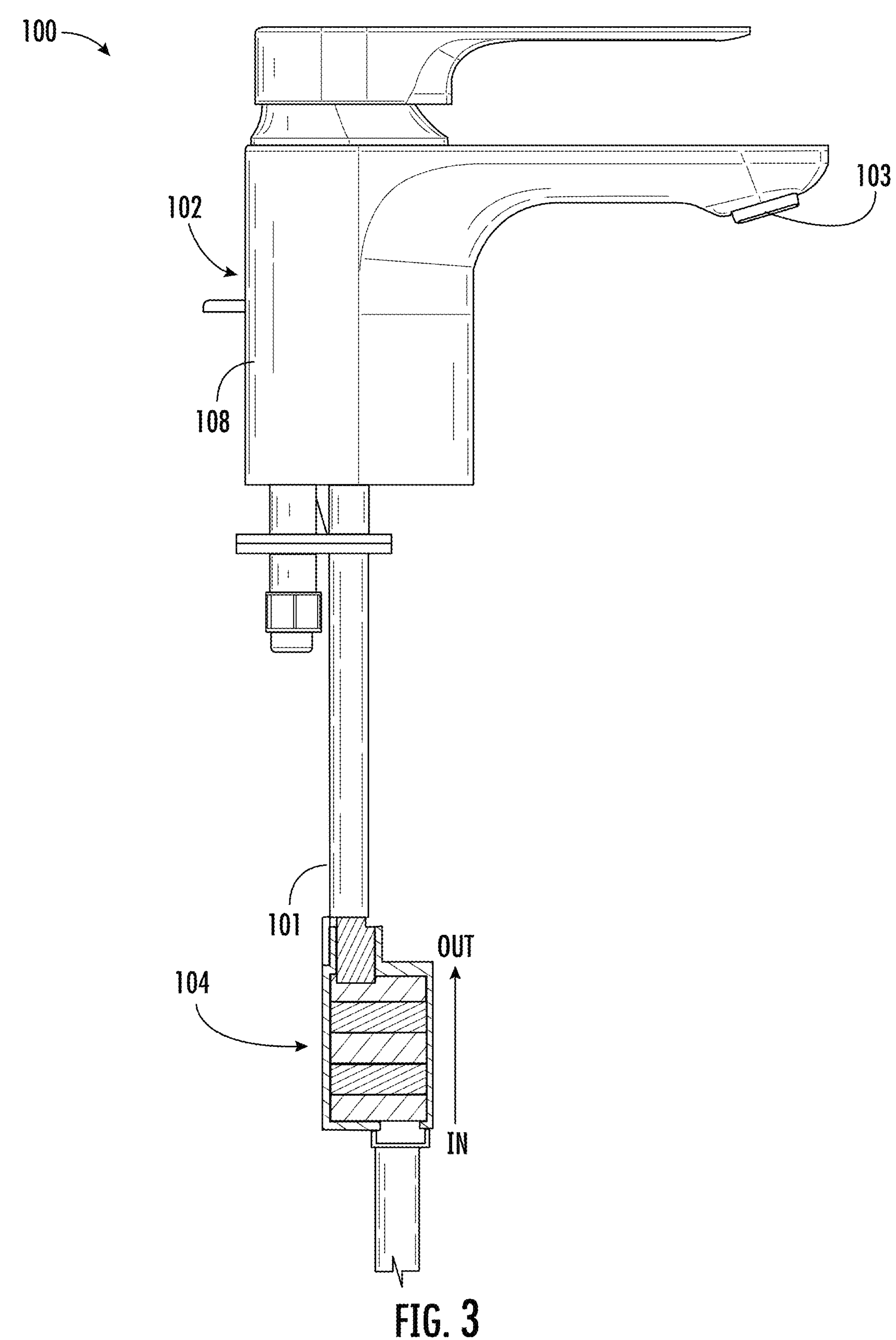
FIG. 3 illustrates a perspective view of a faucet arrangement, in accordance with an alternate embodiment of the present disclosure.

The faucet housing 108 of the faucet unit 102 includes a vertical section and a horizontal section, such that the horizontal section of the faucet housing 108 defines a cell mounting space **108*a* therein. The cell mounting space 108*a* defined in the horizontal section of the faucet housing 108 is accessible through a cavity 108*b* defined a bottom portion of the horizontal section of the faucet housing 108. Notably, the electrolytic cell unit 104 is disposed within the cell mounting space 108*a* defined in the horizontal section of the faucet housing 108. Furthermore, a cover 108*c* is provided to cover/uncover the cavity 108*b*, to restrict and/or allow an access to the electrolytic cell unit 104 disposed within the cell mounting space 108*a* defined in the horizontal section of the faucet housing 108. A fluid connection of the electrolytic cell unit 104, will be explained later in details. Although, the present disclosure describes an embodiment of the faucet unit 112, wherein the electrolytic cell unit 104 is disposed within the cell mounting space 108*a* defined in the horizontal section of the faucet housing 108. In an alternate embodiment of the faucet unit 112, as is shown in FIG. 3, the electrolytic cell unit 104 may be disposed within the supply line 101. Although, in the present disclosure, the cell mounting space 108*a* is explained to be defined in the horizontal section of the faucet housing 108 to house the electrolytic cell unit 104, however, it may be obvious to a person skilled in the art that the cell mounting space 108*a* may also be defined in the vertical section of the faucet housing 108 to house the electrolytic cell unit 104** therein.

The faucet supply line 110 is housed and routed within the faucet housing 108. Notably, the faucet supply line 110 is fluidly disposed between the supply line 101 and the water outlet 103, such that the faucet unit 102 is capable of releasing water at the water outlet 103. In case of the valve actuated faucet unit 102, the faucet supply line 110 release water at the water outlet 103, upon activation of the valve actuated faucet unit. In case of the solenoid actuated faucet unit 102, the faucet supply line 110 release water at the water outlet 103, upon activation of the solenoid valve 112 of the solenoid valve actuated faucet unit 102.

The solenoid valve 112 and the electrolytic cell unit 104 are integrally defined in the faucet supply line 110, such that water passes through the solenoid valve 112 as well as the electrolytic cell unit 104 while flowing through the faucet supply line 110. The solenoid valve 112 is adapted to allow and/or restrict a supply of water therethrough, based on instructions from the control unit 106. Moreover, the electrolytic cell unit 104 is adapted to release a dosage of copper ions flowing therethrough, based on instructions from the control unit 106.

In working operations, the faucet unit 102 can be used in a plurality of modes including, such as but not limited to, a drinking mode, a bathing mode, a handwashing mode, and/or a hygiene mode. In each of the drinking mode, the bathing mode, the handwashing mode, and/or the hygiene mode of the faucet unit 102, water is received from the supply line 101 and supplied to the water outlet 103 through the faucet supply line 110. Notably, a quantity of water released by the faucet unit 102 may vary based on a user selected mode amongst the plurality of modes of the faucet unit 102. Furthermore, while water flows through the faucet unit 102, a dosage of copper ions is released therein, by the electrolytic cell unit 104.

The electrolytic cell unit 104 is a compact electrolytic cell that employs an anode and a cathode, housed in a cell housing. An inlet of the electrolytic cell unit 104 is fluidly connected to the faucet supply line 110 to receive water therefrom, while an outlet is fluidly connected to the water outlet 103 to exit water thereto. Each of the anode and the cathode are at least partially housed within the electrolytic cell unit 104, to interface with water flowing therethrough. One or more of the anode and the cathode is electrically connected to and controllably powered by at least one portion of the control unit 106, to release the dosage of copper ions to the water release by the faucet unit 102. Notably, the dosage of to the water flowing therethrough is dependent inter alia on one or more electric parameters of electric supply supplied to the one or more of the anode and the cathode of the electrolytic cell unit 104. The electric parameters of electric supply include, but is not limited to, an electric voltage, an electric current, and/an electric power of the electric supply supplied to the one or more of the anode and the cathode of the electrolytic cell unit 104. The dosage of copper ions released by the electrolytic cell unit 104 is controlled by the control unit 106, by controlling the one or more electric parameters of electric supply supplied to the one or more of the anode and the cathode of the electrolytic cell unit 104.

The control unit 106 is adapted to control the solenoid valve 112, for controlling the quantity of water released by the faucet unit 102, based on the user selected mode amongst the plurality of modes of the faucet unit 102. Additionally, the control unit 106 is adapted to control the dosage of copper ions released by the electrolytic cell unit 104 based on the user selected mode amongst the plurality of modes of the faucet unit 102. The control unit 106 includes an input/output (I/O) unit 114, a power source 116, and a controller 118. The controller 118 is electrically connected to each of the power source 116, the I/O unit 114, the solenoid valve 112, and the electrolytic cell unit 104.

The I/O unit 114 may be a touch panel that provides a functionality to activate the faucet unit 102. The I/O unit 114 is adapted to receive a user input corresponding to the user selected mode amongst the plurality of modes of the faucet unit 102. The plurality of modes of the faucet unit 102 including, such as but not limited to, the drinking mode, the bathing mode, the handwashing mode, and/or the hygiene mode.

The controller 118 is adapted to receive a signal corresponding to the user selected mode amongst the plurality of modes of the faucet unit 102 from the I/O unit 114. Upon receipt of the signal from the I/O unit 114, the controller 118 further sends a control signal to the solenoid valve 112, to controllably allow the release of water at the water outlet 103 of the faucet unit 102, based on the user selected mode amongst the plurality of modes of the faucet unit 102. Notably the controller 118 of the control unit 106 activates the solenoid valve 112 of the faucet unit 102 for a predefined time period based on the user selected mode amongst the plurality of modes of the faucet unit, to release a predefined quantity of water for the predefined time period based on the user selected mode amongst the plurality of modes of the faucet unit 102. It may be worth noting that the controller 118 keeps the solenoid valve 112 active for the predefined period of time, based on the user selected mode amongst the plurality of modes of the faucet unit 102. For example, in the hygiene mode and the handwashing mode, the solenoid valve 112 is kept active for 5 minutes. Whereas, in the drinking mode, the solenoid valve 112 is kept active for 10 minutes. In a preferred embodiment, as disclosed in the present disclosure described the controller 118 directly sends control signals to the solenoid valve 112 to allow the supply of water from the supply line 101 to the water outlet 103. It may be obvious to a person skilled in the art that, in an alternate embodiment, the control unit 106 may employ a flow controller 118 electrically disposed between the controller 118 and the solenoid valve 112, such that the controller 118 sends signals to the solenoid valve 112 via the flow controller 118, to allow the supply of water from the supply line 101 to the water outlet 103. Concurrent to actuation of the faucet unit 102, upon such receipt of the signal from the I/O unit 114, the controller 118 supplies controlled electric supply to the electrolytic cell unit 104 based on the user selected mode amongst the plurality of modes of the faucet unit 102, to allow the electrolytic cell unit 104 to release the controlled dosage of copper ions to water based on the user selected mode amongst the plurality of modes of the faucet unit 102. For example, the dosage of copper ions released to water during drinking mode of operation of the faucet unit 102, is greater than the dosage of copper ions released to water during handwashing mode of operation of the faucet unit 102. Accordingly, appropriate amount of copper treated water is obtained, based on the requirements in each mode of operation of the faucet unit 102. For example, in the hygiene mode of operation of the faucet arrangement 100, the electrolytic cell unit 104 releases the dosage of copper ions in a range of 0.4-2 PPM. Moreover, in the handwashing (or face washing) mode of operation of the faucet arrangement 100, the electrolytic cell unit 104 releases the dosage of copper ions in a range of 0.3-0.6 PPM. Additionally, in the drinking mode of operation of the faucet arrangement 100, the electrolytic cell unit 104 releases the dosage of copper ions in a range of 0.05-1.3 PPM. With such defined dosage of copper ions, the electrolytic cell unit 104 enables prevention of microorganism growth and kill bacteria & viruses present in water and internal surfaces, prevention of microorganism growth, killing of bacteria & viruses present in water and internal surfaces, in the hygiene mode of operation of the faucet arrangement 100. Additionally, with such defined dosage of copper ions, the electrolytic cell unit 104 provides antioxidant fighting free radicals to promote anti-aging, in the handwashing (or face washing) mode of operation of the faucet arrangement 100. Moreover, with such defined dosage of copper ions, the electrolytic cell unit 104 provides health benefits by providing a controlled amount of copper in drinking water to detoxify, promote formation of blood cells, etc.

In the preferred embodiment, as described in the present disclosure, the controller 118 directly varies the electric voltage of the electric supply supplied to the electrolytic cell unit 104. It may be obvious to a person ordinarily skilled in the art that, in an alternate embodiment, the control unit 106 may employ a voltage regulator disposed between the controller 118 and the electrolytic cell unit 104, such that the controller 118 supplies the electric supply to electrolytic cell unit 104 via the voltage regulator. It may be worth noting that the controller 118 keeps the electrolytic cell unit 104 active for the predefined period of time, based on the user selected mode amongst the plurality of modes of the faucet unit 102. For example, in the hygiene mode and the handwashing mode, electrolytic cell unit 104 is kept active for 5 minutes. Whereas, in the drinking mode, the electrolytic cell unit 104 is kept active for 10 minutes. Although, in the present disclosure, the control unit 106 is described to vary the electric voltage of the electric supply supplied to the electrolytic cell unit 104, to vary the dosage of copper ions released to water flowing therethrough based on the mode of operation of the faucet arrangement 100, it may be obvious to a person ordinarily skilled in the art that the control unit 106 may also vary other parameters, such as but not limited to, the electric current supplied to electrolytic cell unit 104, the flow of water supplied through the electrolytic cell unit 104, and/or a duration of activation of the solenoid valve 112 and the electrolytic cell unit 104, to vary the dosage of copper ions released to water flowing therethrough based on the user selected mode amongst the plurality of modes of the faucet unit 102. Although, in the present disclosure, each of the solenoid valve 112 and the electrolytic cell unit 104 are kept active, in each of the drinking mode, the bathing mode, the handwashing mode, and/or the hygiene mode, for same duration, it may be obvious to a person ordinarily skilled in the art that in one of the modes of operation, the solenoid valve 112 is kept active while the electrolytic cell unit 104 is kept inactive.

One advantage of the present disclosure relates to positioning of the electrolytic cell unit 104 within the cell mounting space **108*a* defined in the horizontal section of the faucet housing 108. As the cell mounting space 108*a* is relatively easily accessible through the cavity 108*b*, the electrolytic cell unit 104 is relatively easily accessible through the cavity 108*b***, for servicing purposes.

Another advantage of the present disclosure relates to the controlled release of the dosage of copper ions by the electrolytic cell unit 104, in the water flowing through the faucet unit 102. In particular, use and/or intake of water with the dosage of copper ions released therein has several health and skin benefits. Moreover, another advantage of the present disclosure relates to the control of the release of the dosage of copper ions by the electrolytic cell unit 104, in the water flowing through the faucet unit 102. In particular, the dosage of copper ions released by the electrolytic cell unit 104 is controlled based on the mode of operation of the faucet unit 102, selected from either of the drinking mode, the bathing mode, the handwashing mode, and/or the hygiene mode. Accordingly, appropriate amount of copper ion fused in water is ensured. This provides for a relatively efficient use of the electrolytic cell unit 104.

While the preferred embodiments of the present invention have been described hereinabove, it should be understood that various changes, adaptations, and modifications may be made therein without departing from the spirit of the invention. It will be obvious to a person skilled in the art that the present invention may be embodied in other specific forms without departing from its spirit or essential characteristics. The described embodiments are to be considered in all respects only as illustrative and not restrictive.

The invention claimed is:

1. A faucet arrangement, comprising:

a faucet unit comprising a valve and adapted to release water responsive to activation of the valve;

an electrolytic cell unit integrated with the faucet unit, and adapted to release a controlled dosage of copper ions within water released by the faucet unit; and a control unit operably coupled to each of the valve and the electrolytic cell unit, the control unit configured to control activation of the valve and operation of the electrolytic cell unit;

wherein the control unit is configured to activate the valve for a predefined time period to release a predefined amount of water during the predefined time period responsive to an input selecting a predetermined mode of a predetermined plurality of modes, each of the predefined time period and the predefined amount of water corresponding to the predetermined mode;

wherein the predetermined plurality of modes comprises at least a first mode corresponding to a first time period and a second mode corresponding to the second time period, the second time period being longer than the first time period; and wherein the predetermined plurality of modes comprises at least a mode in which the control unit is configured to activate the valve while the electrolytic cell unit remains inactive.

2. The faucet arrangement of claim 1, wherein the faucet unit includes a faucet housing defining a vertical section and a horizontal section, and a faucet supply line routed therethrough.

3. The faucet arrangement of claim 2, wherein the faucet supply line is fluidly connected to a supply line, for receiving water therefrom and controllably release at a water outlet.

4. The faucet arrangement of claim 1, wherein the valve is a solenoid valve, such that the faucet unit releases water at the water outlet upon activation of the solenoid valve.

5. The faucet arrangement of claim 4, wherein the control unit is configured to selectively activate or deactivate the solenoid valve to allow and/or restrict the release of at the water outlet.

6. The faucet arrangement of claim 2, wherein the faucet housing defines a cell mounting space, the cell mounting space being accessible through a cavity.

7. The faucet arrangement of claim 6, wherein the electrolytic cell unit is disposed within the cell mounting space defined within the faucet housing, and is fluidly disposed within the faucet supply line, such that water flows through the faucet supply line via the electrolytic cell unit.

8. The faucet arrangement of claim 6, wherein the cavity is covered/uncovered by a cover.

9. The faucet arrangement of claim 6, wherein the electrolytic cell unit is disposed external to the faucet housing, and is fluidly disposed within the supply line, such that water flows through the supply line via the electrolytic cell unit.

10. The faucet arrangement of claim 1, further includes a housing for controllably operating the faucet unit and the electrolytic cell unit.

11. The faucet arrangement of claim 5, wherein the control unit is electrically connected to the solenoid valve of the faucet unit, to controllably operate the faucet unit within the predetermined mode, the predetermined mode selected from the plurality of modes, the plurality of modes including a drinking mode, a bathing mode, a handwashing mode, and/or a hygiene mode.

12. The faucet arrangement of claim 11, wherein the control unit includes an input/output (I/O) unit to receive the input, the input corresponding to a selection of the predetermined mode by a user of the faucet unit.

13. The faucet arrangement of claim 1, wherein the control unit is adapted to controllably operate the electrolytic cell unit to control the dosage of copper ions released by the electrolytic cell unit based on the predetermined mode.

14. The faucet arrangement of claim 13, wherein the control unit controls one or more electric parameters of electric supply supplied to the electrolytic cell unit, to control the dosage of copper ions released by the electrolytic cell unit based on the predetermined mode.

15. The faucet arrangement of claim 13, wherein one or more electric parameters includes an electric voltage, an electric current, and/or an electric power of electric supply supplied to the electrolytic cell unit.

16. The faucet arrangement of claim 1, wherein the dosage of copper ions within the water is in range between about 0.05 and about 2 PPM.

* * * * *